(12) United States Patent
Doman et al.

(10) Patent No.: US 8,657,690 B2
(45) Date of Patent: Feb. 25, 2014

(54) TORQUE LIMITER DEVICE

(75) Inventors: Yasunori Doman, Osaka (JP); Takeshi Hayashi, Osaka (JP); Motonao Nishiyama, Osaka (JP)

(73) Assignee: EXEDY Corporation, Osaka (JP)

( * ) Notice: Subject to any disclaimer, the term of this patent is extended or adjusted under 35 U.S.C. 154(b) by 0 days.

(21) Appl. No.: 13/389,206

(22) PCT Filed: Aug. 10, 2010

(86) PCT No.: PCT/JP2010/063516
§ 371 (c)(1),
(2), (4) Date: Feb. 6, 2012

(87) PCT Pub. No.: WO2011/024639
PCT Pub. Date: Mar. 3, 2011

(65) Prior Publication Data
US 2012/0142437 A1    Jun. 7, 2012

(30) Foreign Application Priority Data
Aug. 27, 2009    (JP) .................................. 2009-196553

(51) Int. Cl.
*F16D 7/02*    (2006.01)
(52) U.S. Cl.
USPC .......................................... 464/46; 464/68.1

(58) Field of Classification Search
USPC ........................................ 464/46, 66.1–68.92
See application file for complete search history.

(56) References Cited

U.S. PATENT DOCUMENTS 7,238,111 B2 *   7/2007   Kintou et al. .................. 464/46
7,377,853 B2 *   5/2008   Takeuchi et al. ............... 464/46

FOREIGN PATENT DOCUMENTS

| JP | 1-139127 A | 9/1989 |
|----|------------|--------|
| JP | 6-65645 A | 9/1994 |
| JP | 7-98042 A | 4/1995 |
| JP | 9-217788 A | 8/1997 |
| JP | 2001-74063 A | 3/2001 |
| JP | 2005-133859 A | 5/2005 |

* cited by examiner

*Primary Examiner* — Gregory Binda
(74) *Attorney, Agent, or Firm* — Global IP Counselors, LLP

(57) ABSTRACT

A torque limiter device includes a flywheel, a clutch disc assembly, a cover plate, a pressure ring, a plurality of friction members, a plurality of rivets and a cone spring. Each of the rivets is fixed to the cover plate and includes a first head portion disposed axially between a disc portion and the cover plate. The cone spring is disposed axially between the first head portions and the pressure ring in a compressed state.

10 Claims, 4 Drawing Sheets

TORQUE LIMITER DEVICE

CROSS-REFERENCE TO THE RELATED APPLICATIONS

This U.S. National Stage Application claims priority under 35 U.S.C. §119(a) to Japanese Patent Application No. 2009-196553 filed in Japan on Aug. 27, 2009. The entire content of Japanese Patent Application No. 2009-196553 is hereby incorporated herein by reference.

TECHNICAL FIELD

The present invention relates to a torque limiter device, particularly to a torque limiter device configured to limit torque to be transmitted from a crankshaft of an engine to a transmission-side shaft.

BACKGROUND ART

Some vehicles include a torque limiter device disposed between an engine and a transmission. The torque limiter device is configured to limit torque to be transmitted thereto for preventing elements (e.g., the transmission) from being damaged or broken due to excessive torque from the engine. For example, the torque limiter device is structured as follows. At least a friction facing is interposed and held between a pair of plates with a predetermined force. Further, the input side of the torque limiter device is coupled to engine-side members (e.g., a flywheel) whereas the output side thereof is coupled to transmission-side members (e.g., an input shaft).

The torque limiter device of the above type includes a drive plate, a transmission torque limiting part, a driven member and a damper mechanism (see e.g., Patent Literature 1). The drive plate includes a friction coupling portion in the outer periphery thereof. The transmission torque limiting part is configured to interpose and hold the friction coupling portion of the drive plate between a pair of plates with a predetermined force. The driven member is coupled to the input shaft of the transmission. The damper mechanism is disposed among the above elements.

In the torque limiter device, engine torque is transmitted from the flywheel to the drive plate via the friction coupling portion, and is further transmitted to the driven-side members and the input shaft of the transmission via the damper mechanism. When the engine torque becomes greater than a predetermined torque, slippage occurs between the friction coupling portion and the plates. Therefore, torque is prevented from being transmitted to the transmission when exceeding the limitation imposed by the transmission torque limiting part. It is thereby possible to prevent the transmission from being damaged or broken due to excessive torque.

Japan Laid-open Patent Application Publication No. JP-A-2003-013992 (PTL1: Patent Literature 1) is an example of the related art.

SUMMARY

In the torque limiter device described in Patent Literature 1, the friction coupling portion is supported by rivets. Therefore, it is easy to simply form the structure of the torque limiter device.

In the structure, however, the friction coupling portion is exposed to the outside. When rain or mud water enters the torque limiter device and the periphery thereof, friction coefficient of the friction coupling portion varies and this results in unstable performance of the torque limiter device.

It is an object of the present invention to provide a torque limiter device for simply forming the structure thereof and stabilizing performance thereof.

A torque limiter device according to the present invention is configured to limit torque to be transmitted from an engine to a transmission. The torque limiter device includes a drive member, a cover member having an annular shape, a pressure member having an annular shape, a friction part, an input-side member, an output-side member, a damper mechanism, a plurality of support members and an elastic member having an annular shape. The drive member includes a disc portion and an annularly protruded portion. The disc portion receives torque inputted thereto from the engine. The annularly protruded portion is axially protruded from an outer periphery of the disc portion. The cover member is fixed to the annularly protruded portion. The pressure member is disposed axially between the disc portion and the cover member. The pressure member is disposed in a unitarily rotatable and axially movable state with respect to the cover member. The friction part is disposed between the cover member and the pressure member. The friction part is disposed slidably with at least either of the cover member and the pressure member. The input-side member is disposed unitarily rotatably with the friction part. The output-side member is configured to transmit torque to the transmission. The damper mechanism elastically couples the input-side member and the output-side member in a rotational direction. The support members are fixed to the cover member and each of the support members include a first head portion disposed axially between the disc portion and the cover member. The elastic member is disposed axially between the first head portions and the pressure member in a compressed state.

In the torque limiter device, the pressure member and the elastic member are disposed axially between the disc portion of the drive member and the cover member. In other words, these members are covered with the cover member. The structure can inhibit rain and mud water from entering the friction surface. Therefore, performance of the torque limiter device can be stabilized.

Further, the elastic member is supported by the first head portions of the support members. Therefore, it is possible to simply form the structure for supporting the elastic member. Especially, the elastic member is directly supported by the first head portions. Therefore, it is easy to simply form the structure.

As described above, according to the torque limiter device of the present invention, it is possible to simply form the structure thereof, and simultaneously, stabilize performance thereof.

DETAILED DESCRIPTION OF THE PREFERRED EMBODIMENTS

Figure 1:
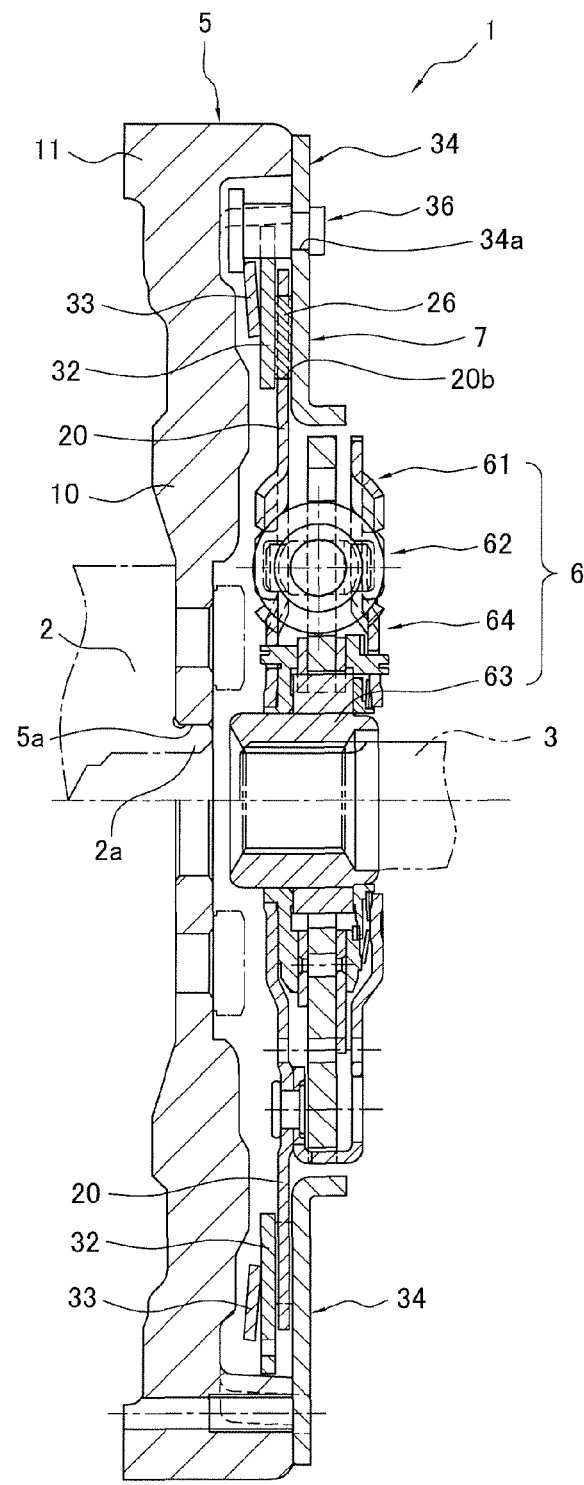
FIG. 1 is a cross-sectional view of a torque limiter device.
Figure 2:
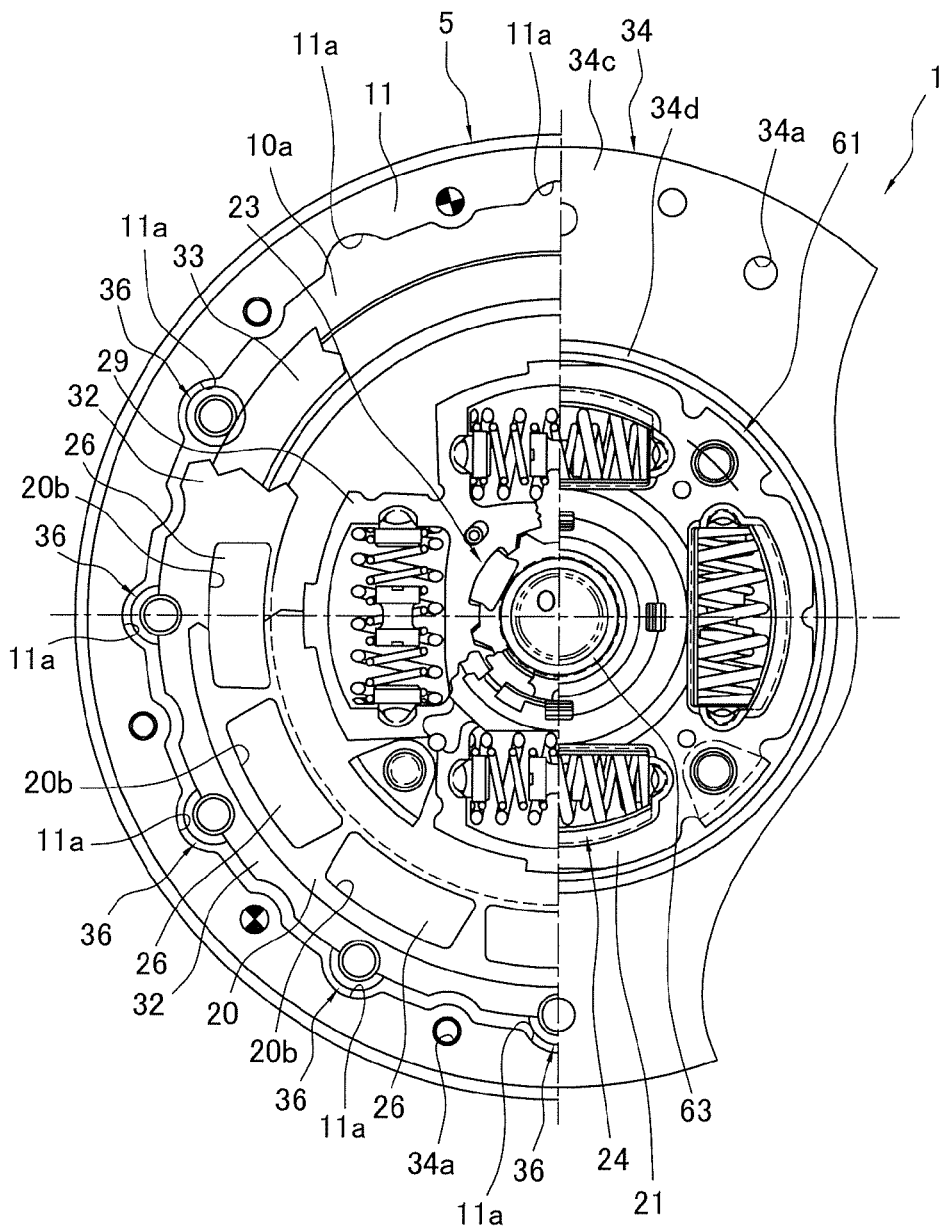
FIG. 2 is a front view of the torque limiter device.

<Entire Structure>
FIG. 1 illustrates a cross-sectional view of a torque limiter device 1. FIG. 2 illustrates a partial front view of the torque limiter device 1. Although not illustrated in FIG. 1, an engine is disposed on the left side of the torque limiter 1 while a transmission is disposed on the right side of the torque limiter 1.

The torque limiter device 1 is disposed between a crankshaft 2 of the engine and an input shaft 3 of the transmission. The torque limiter device 1 is configured to limit torque to be transmitted from the engine to the transmission. The torque limiter device 1 includes a flywheel 5 (an exemplary drive member), a clutch disc assembly 6 and a transmission torque limiting part 7.

<Flywheel>

The flywheel 5 includes a disc portion 10 and an annularly protruded portion 11 axially protruded from the outer periphery of the disc portion 10.

The disc portion 10 is a disc-shaped member fixed to the crankshaft 2. The disc portion 10 includes a center hole 5a and an annular recess 10a. A protruded portion 2a of the crankshaft 2 is fitted into the center hole 5a. Accordingly, the flywheel 5 and the crankshaft 2 are appropriately positioned in a radial direction. The annular recess 10a is axially dented towards the engine. The annular recess 10a accommodates a part of a first head portion 36d of each of rivets 36 (to be described).

A cover plate 34 (to be described) is fixed to the annularly protruded portion 11. The annularly protruded portion 11 includes a plurality of accommodating recesses 11a dented in a radial outward direction. Each accommodating recess 11a accommodates apart of each rivet 36 (to be described).

<Clutch Disc Assembly>

The clutch disc assembly 6 mainly includes an input plate 61 (an exemplary input-side member), a spline hub 63 (an exemplary output-side member), a damper mechanism 62 and a friction producing mechanism 64. The damper mechanism 62 is configured to elastically couple the input plate 61 and the spline hub 63 in a rotational direction.

The input plate 61 includes a clutch plate 20 and a retaining plate 21 fixed to the clutch plate 20. The spline hub 63 is coupled to the input shaft 3 of the transmission.

The damper mechanism 62 mainly includes a hub flange 29, two sets of first spring assemblies 23 and four sets of second spring assemblies 24. The hub flange 29 is rotatably disposed at a first angle with respect to the input plate 61 while being rotatably disposed at a second angle with respect to the spline hub 63. The first spring assemblies 23 elastically couple the input plate 61 and the hub flange 29 in the rotational direction. The second spring assemblies 24 elastically couple the hub flange 29 and the spline hub 63 in the rotational direction. Stiffness of the first spring assemblies 23 is much lower than that of the second spring assemblies 24. The structure achieves a two stage torsional characteristic formed by a first stage of a low torsional stiffness and a second stage of a high torsional stiffness.

The friction producing mechanism 64 is configured to produce so-called hysteresis torque between the input plate 61 and the spline hub 63. For example, the friction producing mechanism 64 is configured to produce a relatively low hysteresis torque in the first stage and produce a hysteresis torque higher than the relatively low hysteresis torque in the second stage. Accordingly, it is possible to effectively enhance vibration attenuating performance of the damper mechanism 62.

<Transmission Torque Limiting Part>

Figure 3:
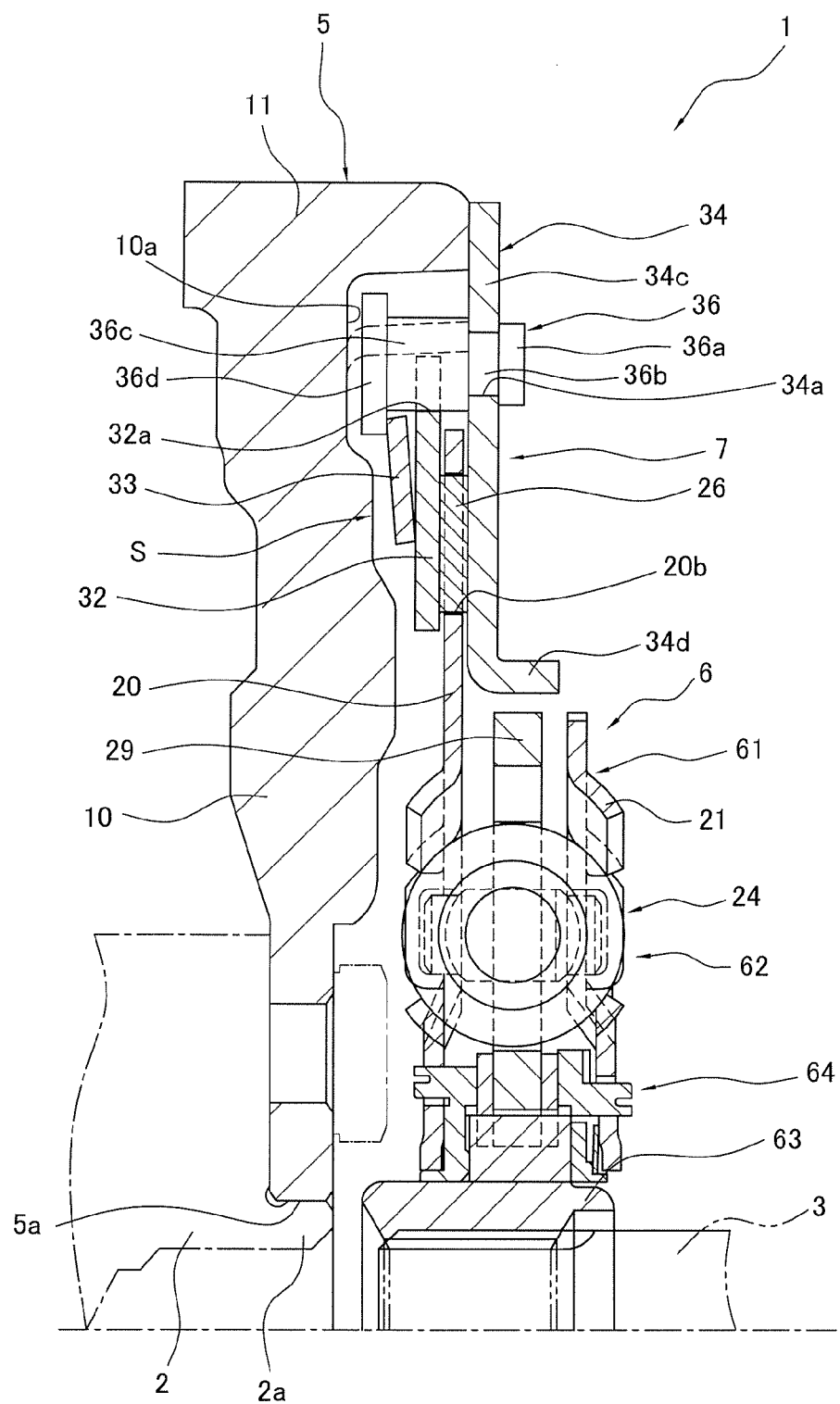
FIG. 3 is an enlarged cross-sectional view of the torque limiter device (the upper half of FIG. 1).
Figure 4:
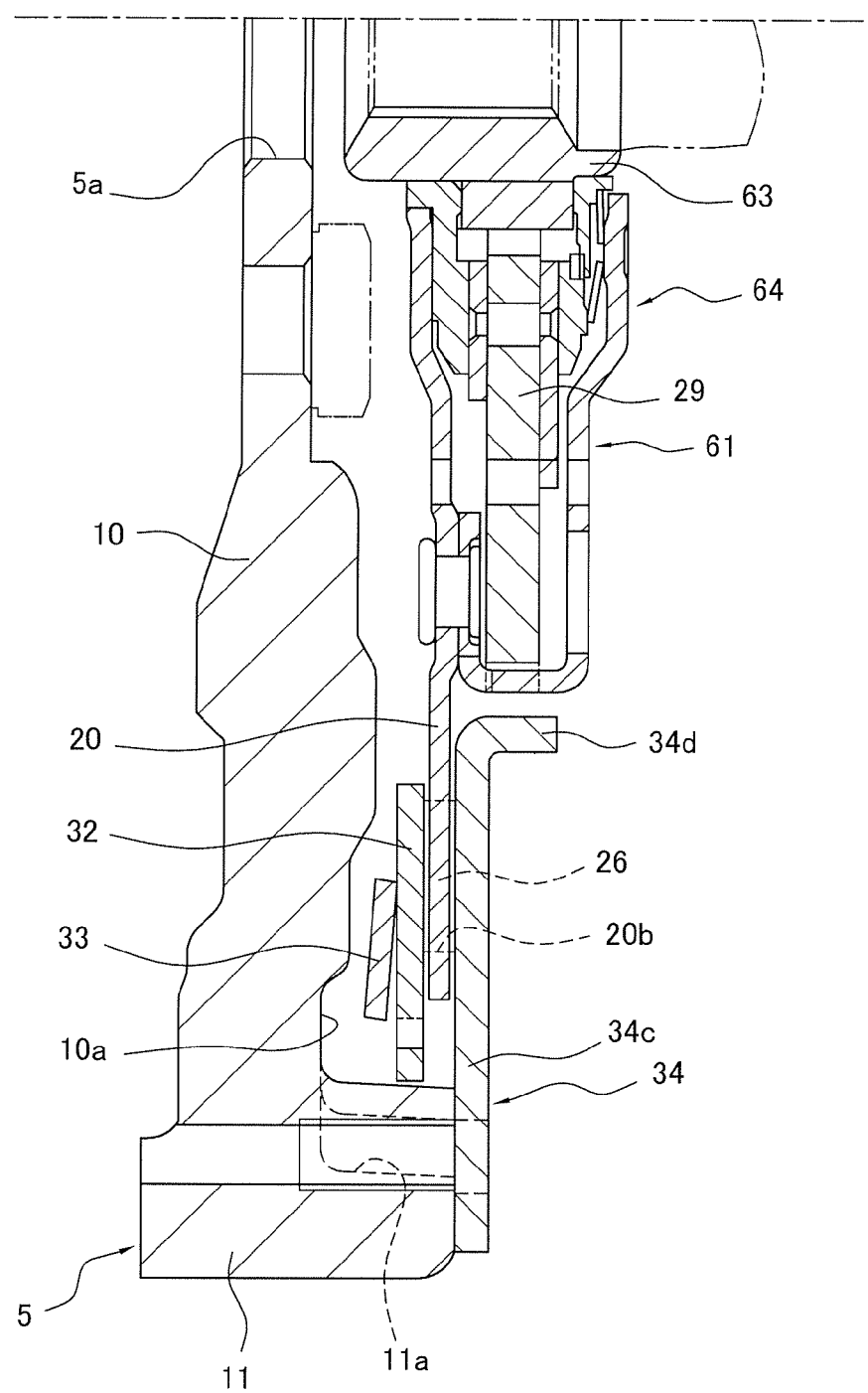
FIG. 4 is an enlarged cross-sectional view of the torque limiter device (the lower half of FIG. 1).

As illustrated in FIGS. 1 to 3, the transmission torque limiting part 7 includes the cover plate 34 (an exemplary cover member), a pressure ring 32 (an exemplary pressure member), a plurality of friction members 26 (an exemplary friction part), a cone spring 33 (an exemplary elastic member) and a plurality of the rivets 36 (exemplary support members).

The cover plate 34 is an annular plate fixed to the annularly protruded portion 11 by means of a plurality of bolts (not illustrated in the figures). The cover plate 34 covers the pressure ring 32, the cone spring 33 and the friction members 26 for preventing these members from being exposed to the outside. Specifically, a space S is produced axially between the disc portion 10 and the cover plate 34 for accommodating the pressure ring 32, the cone spring 33 and the friction members 26.

The cover plate 34 includes an annular main body portion 34c and a tubular portion 34d. The plural rivets 36 are fixed to the main body portion 34c. The tubular portion 34d is axially protruded from the inner periphery of the main body portion 34c. The space S is produced axially between the disc portion 10 and the main body portion 34c. The main body portion 34c and the tubular portion 34d are made of sheet metal and are integrally formed by means of bending. The tubular portion 34d is extended from the inner periphery of the main body portion 34c to the opposite side of the disc portion 10 (i.e., towards the transmission). The input plate 61 and the hub flange 29 of the damper mechanism 62 are disposed radially inwards of the tubular portion 34d while being disposed relatively close to the tubular portion 34d.

The pressure ring 32 is a plate-shaped member disposed in a unitarily rotatable and axially movable state with respect to the cover plate 34. The pressure ring 32 makes contact with friction members 26. The pressure ring 32 is axial-movably supported by the rivets 36 (more specifically, trunk portions 36c). More specifically, the pressure ring 32 includes a plurality of notches 32a on the outer peripheral edge thereof, as illustrated in FIGS. 2 and 3. Each notch 32a has a roughly semicircular shape, and the trunk portion 36c (to be described) of each rivet 36 is inserted therein. Further, the pressure ring 32 is appropriately positioned in the radial direction with respect to the cover plate 34 by means of the rivets 36.

The plural friction members 26 are disposed axially between the pressure ring 32 and the cover plate 34. The friction members 26 are disposed slidably with the pressure ring 32 and the cover plate 34. In the present exemplary embodiment, twelve friction members 26 are disposed. Each friction member 26 is a roughly circular-arc plate member extended along the circumferential direction of the torque limiter device 1. The friction members 26 are circumferentially disposed at equal pitches. It should be noted that the friction members 26 may not be disposed at equal pitches. The clutch plate 20 of the input plate 61 includes a plurality of accommodating holes 20b in the radial outer portion thereof. The accommodating holes 20b are aligned along the circumferential direction of the clutch plate 20. The friction members 26 are fitted into the accommodating holes 20b on a one-to-one basis. The thickness of each friction member 26 is greater than that of the clutch plate 20.

The plural rivets 36 are members for supporting the pressure ring 32 and the cone spring 33. The rivets 36 are fixed to the cover plate 34. In the present exemplary embodiment, twelve rivets 36 are disposed and the number of the rivets 36 is the same as that of the friction members 26. It should be noted that the number of the rivets 36 may be different from that of the friction members 26.

The rivets 36 are circumferentially aligned at the same pitches as those of the friction members 26. More specifically, the plural rivets 36 are circumferentially disposed at equal pitches while being disposed radial outwards of the clutch plate 20, the friction members 26, the pressure ring 32 and the cone spring 33. It should be noted that the rivets 36 may not be circumferentially aligned at the same pitches as those of the friction members 26, and further or alternatively, may not be circumferentially disposed at equal pitches.

Each rivet 36 is entirely integrated and one end thereof is swaged to the cover plate 34. Each rivet 36 includes the first head portion 36d, the trunk portion 36c, an inserted portion 36b and a second head portion 36a.

The first head portion 36d of each rivet 36 serves to support the cone spring 33. The first portion 36d is formed on a disc portion 10 side end (i.e., the engine-side end) of the trunk portion 36c. The first head portion 36d is disposed axially between the cover plate 34 and the disc portion 10. The outer diameter of the first head portion 36d is greater than that of the trunk portion 36c. A clearance is reliably produced between the first head portion 36d and the disc portion 10. Further, the first head portion 36d is accommodated in the annular recess 10a of the disc portion 10 and a corresponding one of the accommodating recesses 11a of the annularly protruded portion 11.

The trunk portion 36c of each rivet 36 serves to support the pressure ring 32. The trunk portion 36c is disposed between the cover plate 34 and the disc portion 10. The outer diameter of the trunk portion 36c is greater than that of the inserted portion 36b.

The inserted portion 36b of each rivet 36 is formed on one end of the trunk portion 36c. The inserted portion 36b is fitted into a corresponding one of holes 34a formed in the cover plate 34.

The second head portion 36a of each rivet 36 is formed on one end of the inserted portion 36b. The outer diameter of the second head portion 36a is greater than that of the inserted portion 36b. The trunk portion 36c and the second head portion 36a are coupled by the inserted portion 36b. The trunk portion 36c and the second head portion 36a interpose the cover plate 34 therebetween. In an actual situation of fixing each rivet 36 to the cover plate 34, the inserted portion 36b is inserted into a corresponding one of the holes 34a, and then, the second head portion 36a is formed. Each rivet 36 is thereby fixed to the cover plate 34.

The cone spring 33 is disposed axially between the pressure ring 32 and the disc portion 10. The cone spring 33 is configured to press the pressure ring 32 towards the cover plate 34. Specifically, the cone spring 33 is axially supported by means of the plural rivets 36 while being disposed axially between the first head portions 36d of the rivets 36 and the pressure ring 32 in a compressed state. Accordingly, the plural friction members 26 are interposed and held axially between the pressure ring 32 and the cover plate 34. Further, the cone spring 33 is radially supported by the rivets 36 (more specifically, the trunk portions 36c).

In the aforementioned torque limiter device 1, transmittable torque is determined by the pressure of the cone spring 33, the friction coefficient of the friction part and the effective radius of the friction part. When a torque greater than the transmittable torque is inputted into the flywheel 5, slippage occurs in the transmission torque limiting part 7 and transmission torque is limited to a predetermined torque.

<Features>

The features of the aforementioned torque limiter device 1 will be hereinafter comprehensively described.

(1) In the torque limiter device 1, the pressure ring 32, the friction members 26 and the cone spring 33 are disposed axially between the disc portion 10 of the flywheel 5 and the cover plate 34. In other words, these members are covered with the cover plate 34. The structure can inhibit rain and mud water from entering the friction surface. Therefore, performance of the torque limiter device 1 can be stabilized.

Further, the cone spring 33 is supported by the first head portions 36d of the rivets 36. In other words, the structure for supporting the cone spring 33 can be simply formed. Especially, the cone spring 33 is directly supported by the first head portions 36d. Therefore, it is possible to reduce the number of components required for the well-known structures and easily form a simple structure.

As described above, it is possible to simply form the structure of the torque limiter device 1 and stabilize the performance of the torque limiter device 1.

(2) The first head portions 36d of the rivets 36 are disposed within the annular recess 10a of the disc portion 10. Therefore, it is possible to reduce the axial size of the torque limiter device 1.

Further, the first head portions 36d are accommodated in the accommodating recesses 11a of the annularly protruded portion 11 on a one-to-one basis. Therefore, the rivets 36 can be disposed as radially outward as possible. Sufficient effective radius can be thereby ensured for the friction surface.

(3) The pressure ring 32 is supported by the rivets 36 in a unitarily rotatable and axially movable state with respect to the cover plate 34. Therefore, the support structure for the pressure ring 32 can be simply formed using the rivets 36.

(4) The cover plate 34 includes the tubular portion 34d extended from the inner periphery of the main body portion 34c to the opposite side of the disc portion 10 (i.e., towards the transmission). Therefore, sufficient stiffness can be ensured for the cover plate 34. Further, the hub flange 29 (or the input plate 61) is disposed radially inwards of the tubular portion 34d. Therefore, it is possible to enhance an effect of inhibiting intrusion of rain and mud water. Especially, it is easy to enhance such intrusion inhibition effect when the hub flange 29 and the tubular portion 34d are disposed relatively close to each other as illustrated in FIG. 3.

OTHER EXEMPLARY EMBODIMENTS

The present invention is not limited to the aforementioned exemplary embodiment. A variety of changes or modifications can be herein made without departing from the scope of the present invention.

(A) In the aforementioned exemplary embodiment, the friction members 26 are press-fitted into the clutch plate 20. However, a cushioning plate may be fixed to the clutch plate and the friction members may be attached to the cushioning plate.

(B) The center hole 5a formed in the center of the flywheel 5 is configured to be engaged with the protruded portion 2a of the crankshaft 2 when the axis of the flywheel 5 is aligned with respect to the crankshaft 2. However, axis alignment of the flywheel 5 with respect to the crankshaft 2 may be executed using a knock pin.

(C) The number of the rivets 36 is not limited to that in the aforementioned exemplary embodiment.

(D) The shape and the number of the friction members are not limited to those in the aforementioned exemplary embodiment. For example, a plurality of circular friction members may be provided.

INDUSTRIAL APPLICABILITY

According to the aforementioned torque limiter device, it is possible to simply form the structure thereof, and simultaneously, stabilize performance thereof. Therefore, the present invention is useful for the art of torque limiter devices.

The invention claimed is:

1. A torque limiter device configured to limit torque to be transmitted from an engine to a transmission, the torque limiter device comprising:
   a drive member including a disc portion being configured to receive torque inputted thereto from the engine, and an annularly protruding portion axially protruding from an outer periphery of the disc portion;
   a cover member having an annular shape, the cover member being fixed to the annularly protruding portion;
   a pressure member having an annular shape, the pressure member being disposed axially between the disc portion and the cover member, the pressure member being disposed unitarily rotatably and axially movably with respect to the cover member;
   a friction part being disposed between the cover member and the pressure member, the friction part being disposed slidably with at least one of the cover member and the pressure member;
   an input-side member being disposed unitarily rotatably with the friction part;
   an output-side member being configured to transmit torque to the transmission;
   a damper mechanism being configured to couple elastically the input-side member and the output-side member in a rotational direction;
   a support member being fixed to the cover member, the support member including a first head portion being disposed axially between the disc portion and the cover member; and
   an elastic member having an annular shape, the elastic member being disposed axially between the first head portion and the pressure member in a compressed state,
   the disc portion includes a surface and an annular recess, the surface facing the pressure member and being axially away from the pressure member, the surface being in an inner periphery side of the annular recess and axially opposing the friction part, the annular recess being axially dented from the surface, the first head portion being arranged to be at least partially in the annular recess.

2. The torque limiter device recited in claim 1, wherein the support is disposed axially away from the disc portion.

3. The torque limiter device recited in 1, wherein the first head portion is disposed radially inwards of the annularly protruded portion.

4. The torque limiter device recited in 1, wherein the annularly protruded portion includes an accommodating recess, which is dented radially outwards for allowing the first head portion to be at least partially disposed therein.

5. The torque limiter device recited in claim 1, wherein the support member includes a trunk portion being disposed axially between the cover member and the disc portion,
   the first head portion is formed on a disc portion side end of the trunk portion, and
   the first head portion has an outer diameter greater than an outer diameter of the trunk portion.

6. The torque limiter device recited in claim 5, wherein the cover member includes a hole,
   the support member includes an inserted portion being formed on an end of the trunk portion, and a second head portion being formed on an end of the inserted portion on an opposite side of the trunk portion,
   the second head portion has an outer diameter greater than an outer diameter of the inserted portion,
   the inserted portion is inserted into the hole, and
   the cover member is interposed and held between the trunk portion and the second head portion of the support member.

7. The torque limiter device recited in claim 1, wherein the pressure member is unitarily rotatably and axially movably supported by the support member with respect to the cover member.

8. The torque limiter device recited in claim 1, wherein the cover member includes a main body portion having an annular shape, and a tubular portion extending from an inner periphery of the main body portion in a direction opposite to the disc portion, and
   the main body portion is configured to allow the support member to be fixed thereto.

9. The torque limiter device recited in claim 8, wherein the damper mechanism is disposed radially inwards of the tubular portion.

10. The torque limiter device recited in claim 9, wherein the friction part includes a plurality of friction members which are circumferentially aligned,
    the input side member includes a plurality of accommodating holes which are circumferentially aligned, and
    the plurality of friction members includes a first friction member being inserted into the accommodating hole.

* * * * *